US011836982B2

United States Patent
Joseph et al.

(10) Patent No.: US 11,836,982 B2
(45) Date of Patent: Dec. 5, 2023

(54) SECURITY CAMERA WITH VIDEO ANALYTICS AND DIRECT NETWORK COMMUNICATION WITH NEIGHBORING CAMERAS

(71) Applicant: Honeywell International Inc., Charlotte, NC (US)

(72) Inventors: Jeslin Paul Joseph, Bengaluru (IN); Kingslin Joseph, Bangalore South (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 43 days.

(21) Appl. No.: 17/551,972

(22) Filed: Dec. 15, 2021

(65) Prior Publication Data

US 2023/0186630 A1    Jun. 15, 2023

(51) Int. Cl.
*G06V 20/40* (2022.01)
*G06V 20/52* (2022.01)
(Continued)

(52) U.S. Cl.
CPC ............ *G06V 20/44* (2022.01); *G06T 7/20* (2013.01); *G06V 10/70* (2022.01); *G06V 20/52* (2022.01);
(Continued)

(58) Field of Classification Search
CPC .... G06F 21/554; G06F 18/21; G06F 18/2431; G06F 21/31; G06N 5/04; G06N 20/20;
(Continued)

(56) References Cited

U.S. PATENT DOCUMENTS 6,775,642 B2   8/2004   Remboski et al.
7,683,929 B2   3/2010   Elazar et al.
(Continued)

FOREIGN PATENT DOCUMENTS

CN   103366738 B   8/2016
CN   205600145 U   9/2016
(Continued)

OTHER PUBLICATIONS

Saimurugan, et al; "Intelligent Fault Diagnosis for Rotating Machinery Based on Fusion of Sound Signal", International Journal of Prognostics and Health Management, 10 pages, 2016.
(Continued)

*Primary Examiner* — Lin Ye
*Assistant Examiner* — Tuan H Le
(74) *Attorney, Agent, or Firm* — Seager, Tufte & Wickhem, LLP (57) ABSTRACT

A monitored area including a plurality of video cameras is monitored for possible events. A video camera captures a video stream showing a portion of the monitored area and performs video analysis on the captured video stream. When the video camera identifies an event of interest within the captured video stream, the video camera generates event information associated with the identified event of interest. The video camera uses the relative location information to determine which video camera of the plurality of video cameras is positioned to capture the event of interest now and/or in the future and instructs that video camera to track the event.

16 Claims, 5 Drawing Sheets

(51) Int. Cl.
*G06V 10/70* (2022.01)
*H04N 23/661* (2023.01)
*H04N 23/90* (2023.01)
*G06T 7/20* (2017.01)
*H04N 5/77* (2006.01)
*H04N 7/18* (2006.01)

(52) U.S. Cl.
CPC .............. *H04N 5/77* (2013.01); *H04N 7/18* (2013.01); *H04N 23/661* (2023.01); *H04N 23/90* (2023.01); *G06T 2207/10016* (2013.01); *G06T 2207/30232* (2013.01)

(58) Field of Classification Search
CPC ........ G06N 3/045; G06V 10/25; G06V 10/82; G06V 20/41; G06V 20/52; G06V 30/19173; G06V 30/274; G06V 20/44; G08B 13/19613; G08B 29/188; G08B 13/19671; G08B 29/186; H04N 23/90; H04N 7/18; G06Q 50/265
See application file for complete search history.

(56) References Cited

U.S. PATENT DOCUMENTS

| | | | |
|---|---|---|---|
| 8,643,539 | B2 | 2/2014 | Pauly et al. |
| 8,938,404 | B2 | 1/2015 | Capman et al. |
| 9,244,042 | B2 | 1/2016 | Rank |
| 9,658,100 | B2 | 5/2017 | Park |
| 9,740,940 | B2 | 8/2017 | Chattopadhyay et al. |
| 10,115,279 | B2 | 10/2018 | Renkis |
| 10,334,437 | B2 | 6/2019 | Katsman et al. |
| 10,354,655 | B1 | 7/2019 | White et al. |
| 10,475,468 | B1 | 11/2019 | Yelchuru et al. |
| 10,615,995 | B2 | 4/2020 | Yu |
| 10,616,465 | B2 | 4/2020 | Chowdhery et al. |
| 10,636,173 | B1* | 4/2020 | Beach .................... G06V 10/82 |
| 10,755,730 | B1 | 8/2020 | Maurer et al. |
| 11,188,758 | B2 | 11/2021 | Lee et al. |
| 2005/0004797 | A1 | 1/2005 | Azencott |
| 2007/0177023 | A1 | 8/2007 | Beuhler et al. |
| 2008/0309761 | A1 | 12/2008 | Kienzle et al. |
| 2012/0044354 | A1 | 2/2012 | Cheng et al. |
| 2012/0147191 | A1 | 6/2012 | Snoussi |
| 2012/0245927 | A1 | 9/2012 | Bondy |
| 2014/0211988 | A1* | 7/2014 | Fan ......................... G06V 20/52 382/103 |
| 2016/0006989 | A1 | 1/2016 | Swanson |
| 2016/0091398 | A1 | 3/2016 | Pluemer |
| 2016/0191268 | A1 | 6/2016 | Diebel |
| 2016/0327522 | A1 | 11/2016 | Tanaka et al. |
| 2016/0330062 | A1 | 11/2016 | Alloin et al. |
| 2017/0153790 | A1 | 6/2017 | Mohanam et al. |
| 2018/0040222 | A1 | 2/2018 | Findlay et al. |
| 2018/0103190 | A1* | 4/2018 | Nguyen ............... H04N 23/667 |
| 2019/0108735 | A1 | 4/2019 | Xu |
| 2020/0030378 | A1 | 1/2020 | Chapuis et al. |
| 2020/0066257 | A1 | 2/2020 | Smith et al. |
| 2020/0301378 | A1 | 9/2020 | McQueen et al. |
| 2021/0004950 | A1 | 1/2021 | Kondamari et al. |
| 2021/0256060 | A1 | 8/2021 | Kim et al. |

FOREIGN PATENT DOCUMENTS

| | | |
|---|---|---|
| CN | 208674967 U | 3/2019 |
| CN | 106657867 B | 8/2019 |
| CN | 211787395 U | 10/2020 |
| EP | 3193317 A1 | 7/2017 |
| EP | 3238442 B1 | 5/2021 |

OTHER PUBLICATIONS

Pan, et al; "Cognitive Acoustic Analytics Service for Internet of Things", 2017 IEEE International Conference on Cognitive Computing (ICCC), 8 pages, Jun. 25-30, 2017.

Scardapane et al; "Microphone Array Based Classification for Security Monitoring in Unstructured Environments", AEU_ International Journal of Electronics and Communications, vol. 69, Issue 11, 9 pages, Nov. 2015.

Ntalampiras, et al; "On Acoustic Surveillance of Hazardous Situations", 2009 IEEE International Conference on Acoustics, Speech and Signal Processing, 5 pages, Apr. 19-24, 2009.

Maijala, et al; "Environmental Noise Monitoring Using Source Classification in Sensors", Applied Acoustics, vol. 129, 10 pages, Jan. 2018.

Dey, et al; "Smart City Surveillance: Leveraging Benefits of Cloud Data Stores", First IEEE International Workshop on GLObal Trends in Smart Cities, go SMART 2012, pp. 868-876, Clearwater, 2012.

Foggia et al; "Audio Surveillance of Roads: A System for Detecting Anamalous Sounds," IEEE Transactions on Intelligent Transportation Systems, vol. 17, No. 1, pp. 278-288, Jan. 2016.

Sound effects-Royalty Free FX Library/Pond 5 https://www.pond5.com/sound-effects/ Accessed Mar. 22, 2021.

Street Comer Videos/Royalty-Free Stock Footage, Pond 5 Inc. 2021.

U.S. Appl. No. 17/138,168, filed Dec. 30, 2020.
U.S. Appl. No. 17/188,854, filed Mar. 1, 2021.
U.S. Appl. No. 17/208,542, filed Mar. 22, 2021.
U.S. Appl. No. 17/215,790, filed Mar. 29, 2021.
U.S. Appl. No. 17/593,934, filed Sep. 28, 2021.

Nikodem et al; "Multi-Camera Vehicle Tracking Using Edge Computing and Low-Power Communication," Sensors, vol. 20, 3334,16 pages, 2020.

Wang, "Distributed Muti-object Tracking with Multi-camera Systems Composed of Overlapping and Non-Overlapping and Non-overlapping Cameras," Theses, Dissertations, and Student Research from Electrical & Computer ingineering, 47, 197 pages, 2013.

Indian Application No. 202111027026 filed Jun. 17, 2021.

European Search Report, EP Application No. 22209739.6, European Patent Office, dated May 11, 2023 (11 pages).

* cited by examiner

SECURITY CAMERA WITH VIDEO ANALYTICS AND DIRECT NETWORK COMMUNICATION WITH NEIGHBORING CAMERAS

TECHNICAL FIELD

The present disclosure pertains generally to security systems having video cameras and more particularly to security systems having a plurality of video cameras configured to communicate with each other.

BACKGROUND

A variety of areas have video cameras disposed within the areas for providing security. Some video cameras have video analytics capability and thus can possible detect various events on their own, without having to transmit their video to a remote server for further analysis. This can save valuable time. When a first video camera detects an event, especially an event that may be moving, there may be benefit to having neighboring video cameras also attempt to track the event as the event moves. A need remains for systems and methods for video cameras to be able to communicate directly with their neighbors in order to more quickly and efficiently track events including moving events.

SUMMARY

This disclosure relates generally to security systems having video cameras and more particularly to security systems having a plurality of video cameras configured to communicate with each other. An example is found in a surveillance video camera that includes a memory, a camera, a network port and one or more processors that are operably coupled with the memory, the camera and the network port. The memory is configured to store a network address for each of one or more neighboring video cameras, wherein each of the one or more neighboring video cameras is network accessible to the surveillance video camera via a network. The camera has a field of view and is configured to capture a video stream of the field of view. The one or more processors are configured to perform video analysis on the video stream captured by the camera, looking for possible events of interest within the video stream. When a possible event of interest is identified in the video stream, the one or more processors are configured to generate event information associated with the identified possible event of interest, retrieve from the memory the network address associated with a selected one of the one or more neighboring video cameras, assemble one or more messages for transmission to the selected one of the one or more neighboring video cameras, each of the one or more messages including at least part of the event information and a destination network address, wherein the destination network address is set to the network address of the selected one of the one or more neighboring video cameras. The one or more processors are further configured to send the one or more messages over the network via the network port, where the one or more messages, once received by the selected one of the one or more neighboring video cameras, alert the selected one of the one or more neighboring video cameras to use at least part of the event information to watch for the identified possible event of interest in the field of view of the camera of the selected one of the one or more neighboring video cameras.

Another example is found in a method of monitoring a monitored area for events of interest, the monitored area including a plurality of video cameras disposed about the monitored area, each of the plurality of video cameras storing relative location information and network address information for at least some of the other video cameras of the plurality of video camera. A video camera of the plurality of video cameras captures a video stream showing a portion of the monitored area and performs video analysis on the captured video stream. When the video camera identifies an event of interest within the captured video stream, the video camera generates event information associated with the identified event of interest. The video camera uses the relative location information to determine which video camera of the plurality of video cameras is positioned to capture the event of interest now and/or in the future. The video camera uses the network address information of the video camera of the plurality of video cameras that was determined to be positioned to capture the event of interest now and/or in the future to address a network communication to that video camera to begin looking for the identified event of interest, the network communication including at least some of the event information.

Another example is found in a non-transitory, computer-readable storage medium having instructions stored thereon. When the instructions are executed by one or more processors of a video camera, the one or more processors of the video camera are caused to capture a video stream showing a field of view and perform video analysis on the captured video stream to identify an event of interest within the field of view. When the video camera detects an event of interest within the captured video stream, the one or more processors of the video camera are caused to capture a video clip of the event of interest, use location information stored within the video camera to determine a particular video camera that is positioned to capture the event of interest now and/or in the future, instruct the particular video camera to capture and track the event of interest, and send the video clip to a remote site.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Figure 1:
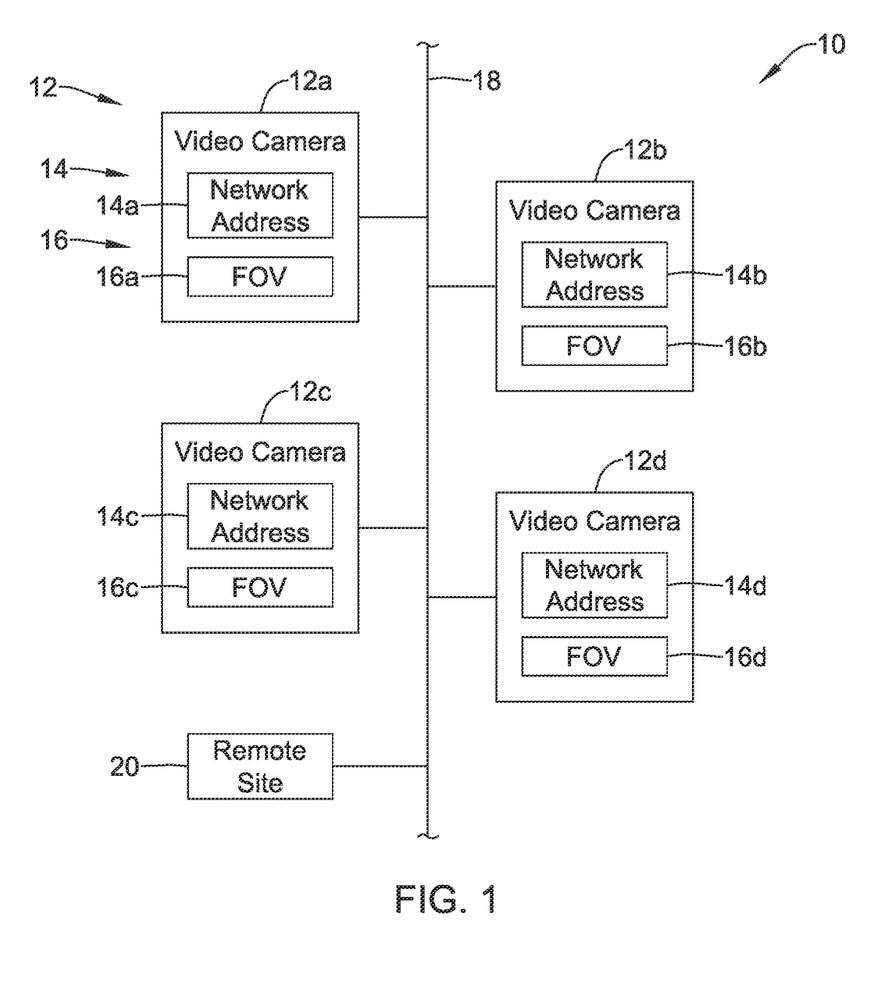
FIG. 1 is a schematic block diagram of an illustrative surveillance system.

FIG. 1 is a schematic block diagram showing an illustrative surveillance system 10. The illustrative surveillance system 10 includes a plurality of video cameras 12, individually labeled as 12a, 12b, 12c and 12d. While a total of four video cameras 12 are shown, it will be appreciated that in some cases the surveillance system 10 may have fewer than four video cameras 12. In some instances, the surveillance system 10 may have substantially more than four video cameras 12.

Each of the plurality of video cameras 12 include a network address 14, individually labeled as 14a, 14b, 14c and 14d. Each of the plurality of video cameras 12 include a Field of View (FOV) 16, individually labeled as 16a, 16b, 16c and 16d, which defines at least in part what each of the plurality of video cameras 12 can see. For fixed video cameras, the corresponding FOV 16 is also fixed. For adjustable cameras, such as PTZ (pan tilt zoom) cameras, the corresponding FOV 16 is adjustable.

The network address 14 for each video camera 12 identifies a specific addressable location for that video camera 12 on a network 18. While the network 18 is generically illustrated as being a wired network, in some cases the network 18 may be a wireless network communicating using any of a variety of different wireless communication protocols. In some instances, the video cameras 12 may communicate via a 5G cellular network, for example. As will be discussed with respect to FIG. 2, each video camera 12 may also know (e.g. store) the network address 14 and in some cases the FOV 16 for each of the other video cameras 12, or at least neighboring video cameras 12.

The illustrative surveillance system 10 also includes a remote site 20 that is operably coupled with the network 18 and thus each of the video cameras 12 can communicate with the remote site 20 over the network 18. In some cases, the remote site 20 may be considered as being a remote computer or even a remote cloud-based server that has video analytics capabilities that can be used to ascertain whether a particular video clip of a possible event shows a true event or a false event, i.e., a false alarm. In some cases, the remote site 20 may include a display that can be used to display a video clip of a possible event so that a human observer can determine whether the video clip shows a true event or a false event.

Figure 2:
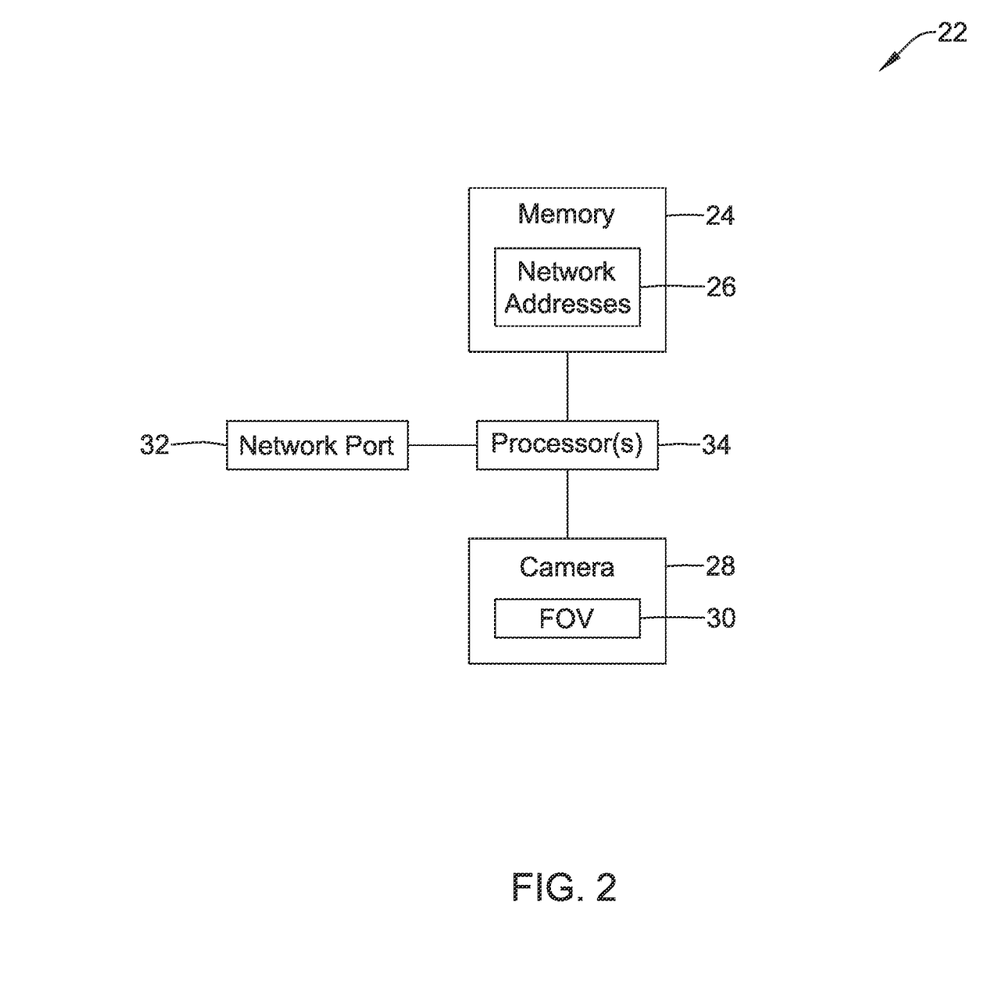
FIG. 2 is a schematic block diagram of an illustrative video camera usable in the illustrative surveillance system of FIG. 1, the illustrative video camera including one or more processors.

FIG. 2 is a schematic block diagram of an illustrative surveillance video camera 22 that may be considered as being an example of the video cameras 12 shown in FIG. 1. The illustrative surveillance video camera 22 includes a memory 24 that is configured to store network addresses 26 for each of one or more neighboring video cameras, where each of the one or more neighboring video cameras is network accessible to the surveillance video camera 22 via a network, such as network 18. In some cases, the network addresses 26 may include the network address for the surveillance video camera 22 itself, much like the network address 14 shown in FIG. 1. The illustrative surveillance video camera 22 includes a camera 28 having a Field of View (FOV) 30 and is configured to capture a video stream of the FOV. The FOV 30 may be considered as the FOV 16 shown in FIG. 1. The illustrative surveillance video camera 22 also includes a network port 32 that allows the surveillance video camera 22 to communicate over the network 18. The surveillance video camera 22 may, for example, communicate via an Open Network Video Interface Forum (ONVIF).

The illustrative surveillance video camera 22 further includes one or more processors 34 that are operably coupled with the memory 24, the camera 28 and the network port 32. The one or more processors 34 are configured to, for example, perform video analysis on the video stream captured by the camera 28, looking for possible events of interest within the video stream. When a possible event of interest is identified in the video stream, the one or more processors 34 are configured to generate event information associated with the identified possible event of interest and to retrieve from the memory 24 the network address associated with a selected one (or more) of the one or more neighboring video cameras 12. The one or more processors 34 are configured to assemble one or more messages for transmission to the selected one of the one or more neighboring video cameras 12, each of the one or more messages including at least part of the event information and a destination network address, wherein the destination network address is set to the network address of the selected one of the one or more neighboring video cameras 12. The one or more processors 34 are configured to send the one or more messages over the network 18 via the network port 32. The one or more messages, once received by the selected one of the one or more neighboring video cameras 12, alert the selected one of the one or more neighboring video cameras 12 to use at least part of the event information to watch for the identified possible event of interest in the field of view of the camera 28 of the selected one of the one or more neighboring video cameras 12.

In some cases, the one or more messages are sent over the network 18 via the network port 32 to the selected one of the one or more neighboring video cameras 12 using a peer-to-peer communication protocol. In some instances, the network 18 includes the Internet, and the network address of the selected one of the one or more neighboring video cameras 12 is an Internet Protocol (IP) address.

In some cases, the event information that is included in the one or more messages includes one or more of an image captured by the camera 28 that is representative of the identified possible event of interest and a video clip captured by the camera 28 that is representative of the identified possible event of interest. Alternatively, or in addition, the event information may include metadata, where the metadata may be generated based at least in part on one or more images of the identified possible event of interest captured by the camera 28. The one or more messages may include at least some of the metadata. The one or more messages may, for example, include metadata that specifies one or more parameters that can be used to identify one or more objects of interest in an image and/or a video clip captured by the camera 28 that are representative of the identified possible event of interest. For example, the one or more parameters may identify an object type (car, person, suitcase, clothing item, glasses, hat, etc.), an object color (red, yellow, green, etc.) an object size (height, width, etc.), an object relationship (e.g. object A is near Object B, Object A followed Object B in time and/or space, etc.), object movement (e.g. movement speed, movement direction, etc.) and/or any other parameter as desired. These parameters may be determined by the one or more processors when performing video analysis on the video stream captured by the camera 22.

In some cases, the one or more processors 34 may be configured to transmit at least some of the event information to the remote site 20, and receive back from the remote site 20 a determination as to whether the identified possible event of interest represents a true event of interest or a false event of interest. The one or more processors 34 may be further configured to ignore any subsequent detection of the identified possible events of interest when the remote site 20 reports back that the identified possible event of interest is a false event of interest.

In some cases, the memory 24 may be configured to store relative location information of each of the one or more neighboring video cameras 12, and the one or more processors 34 may be configured to identify a direction of movement of the identified possible event of interest in the FOV 30 of the camera 28, and use the relative location information of each of the one or more neighboring video cameras 12 and the direction of movement of the identified possible event of interest to identify the selected one of the one or more neighboring video cameras 12. For example, the relative location information may identify a first neighboring camera that is positioned just South of the camera 28 with a field of view that abuts up with the South edge of the field of view of the camera 28, and a second neighboring camera that is positioned just North of the camera 28 with a field of view that abuts up with the North edge of the field of view of the camera 28. This is just one example.

In some instances, the memory 24 may be configured to store relative FOV 30 information of the camera 28 relative to the FOV of each of one or more neighboring video cameras 12, and the one or more processors 34 may be configured to identify a direction of movement of the identified possible event of interest in the FOV 30 of the camera 28, and use the relative FOV 30 information of the camera 28 of each of the one or more neighboring video cameras 12 and the direction of movement of the identified possible event of interest to identify the selected one of the one or more neighboring video cameras 12.

In some instances, the one or more processors 34 may be configured to use Machine Learning (ML) and/or Artificial Intelligence (AI) when performing video analysis on the video stream to identify possible events of interest within the video stream. The video analysis may include one or more of people detection, people counting, crowd detection, face detection, facial recognition, animal detection, car detection, license plate detection, fire detection, speed detection, direction detection, detection of weapons such as guns or knives, detection of animals crossing their cage, detection of traffic violations, and detection of tampering with the video camera. The video analysis may include tracking one or more objects in the FOV 30 of the camera 28 over time and space. In some cases, the camera 28 may be is a pan-tilt-zoom (PTZ) camera, and the video analysis may include changing the field of view of the PTZ camera to track the one or more objects in the field of view of the camera 28.

Figure 3:
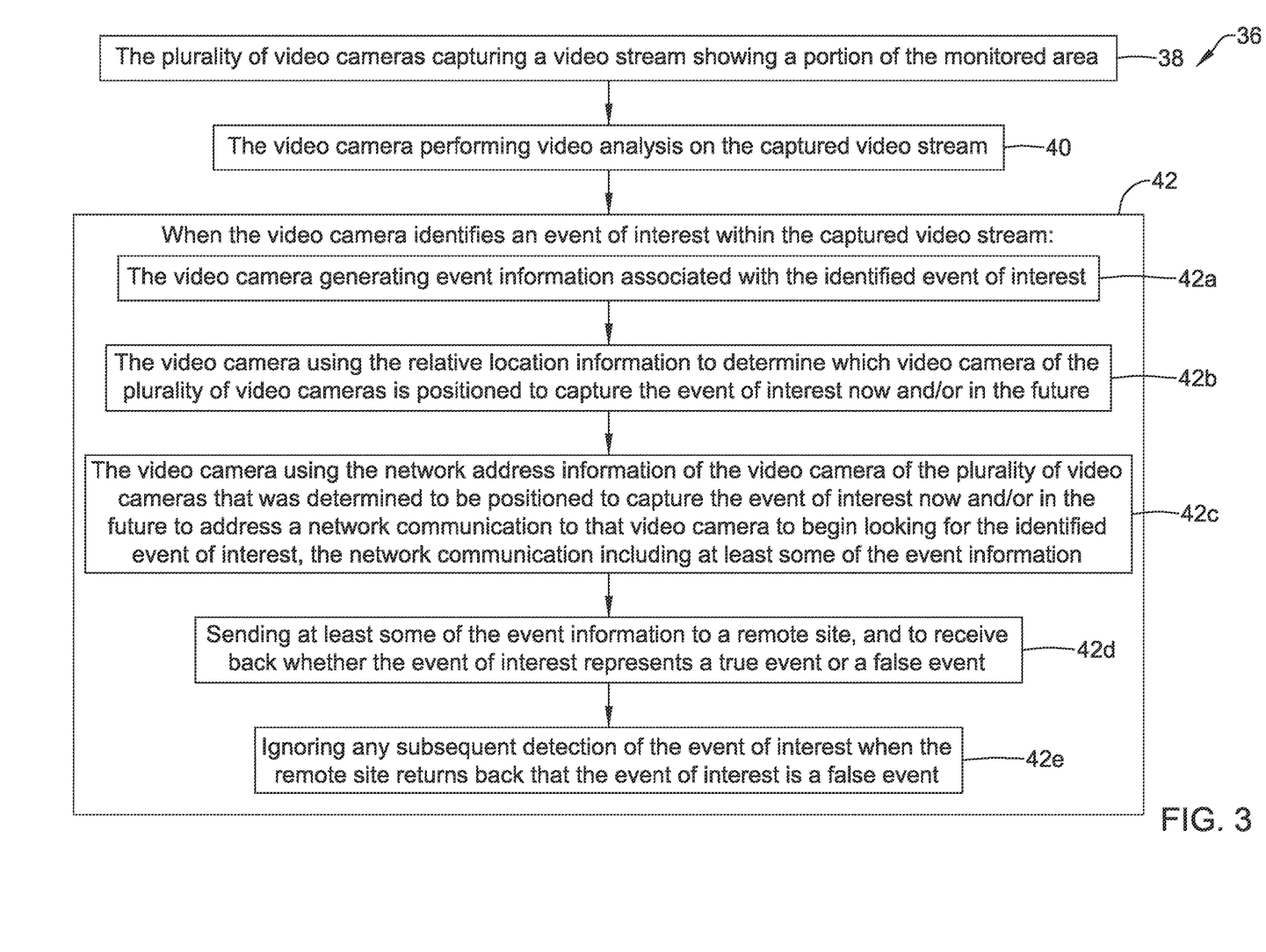
FIG. 3 is a flow diagram showing an illustrative method.

FIG. 3 is a flow diagram showing an illustrative method 36 of monitoring a monitored area for events of interest, the monitored area including a plurality of video cameras (such as the video cameras 12) disposed about the monitored area, each of the plurality of video cameras storing relative location information and network address information for at least some of the other video cameras of the plurality of video cameras. A video camera of the plurality of video cameras captures a video stream showing a portion of the monitored area, as indicated at block 38. The video camera performs video analysis on the captured video stream, as indicated at block 40.

When the video camera identifies an event of interest within the captured video stream, as indicated at block 42, the video camera generates event information associated with the identified event of interest, as indicated at block 42a. The video camera uses the relative location information to determining which video camera of the plurality of video cameras is positioned to capture the event of interest now and/or in the future, as indicated at block 42b. The video camera uses the network address information of the video camera of the plurality of video cameras that was determined to be positioned to capture the event of interest now and/or in the future to address a network communication to that video camera to begin looking for the identified event of interest, the network communication including at least some of the event information, as indicated at block 42c.

In some instances, the event information includes metadata that is generated based at least in part on one or more images of the identified event of interest captured by the video camera, and at least some of the metadata is included in the network communication to the video camera of the plurality of video cameras that was determined to be positioned to capture the event of interest now and/or in the future.

In some cases, and as indicated at block 42d, the video camera may send at least some of the event information to a remote site, and to receive back whether the event of interest represents a true event or a false event. The video camera may ignore any subsequent detection of the particular event of interest when the remote site returns back that the particular event of interest is a false event, as indicated at block 42e.

Figure 4:
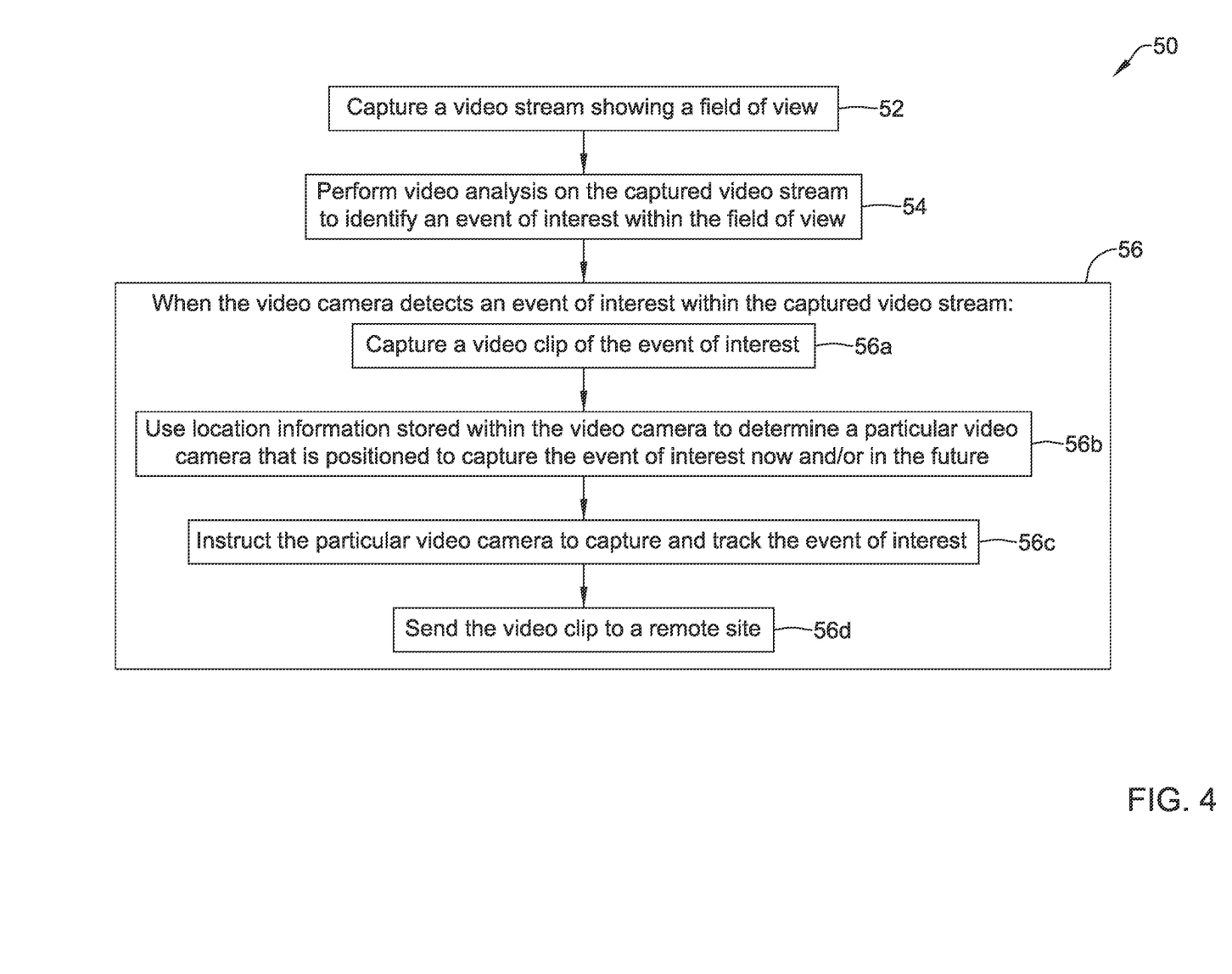
FIG. 4 is a flow diagram showing an illustrative method.

FIG. 4 is a flow diagram showing an illustrative method 50 that may be carried out by one or more processors (such as the one or more processors 34) of a video camera when the one or more processors execute instructions that are stored on a non-transitory, computer-readable storage medium. When the instructions are executed by one or more processors of the video camera, the one or more processors of the video camera are caused to capture a video stream showing a field of view, as indicated at block 52, and to perform video analysis on the captured video stream to identify an event of interest within the field of view, as indicated at block 54.

When the video camera detects an event of interest within the captured video stream, as indicated at block 56, the one or more processors of the video camera are caused to capture a video clip of the event of interest, as indicated at block 56*a*. The one or more processors of the video camera are caused to use location information stored within the video camera to determine a particular video camera that is positioned to capture the event of interest now and/or in the future, as indicated at block 56*b*. The one or more processors of the video camera are caused to instruct the particular video camera to capture and track the event of interest, as indicated at block 56*c*. The one or more processors of the video camera are caused to send the video clip to a remote site, as indicated at block 56*d*.

Figure 5:
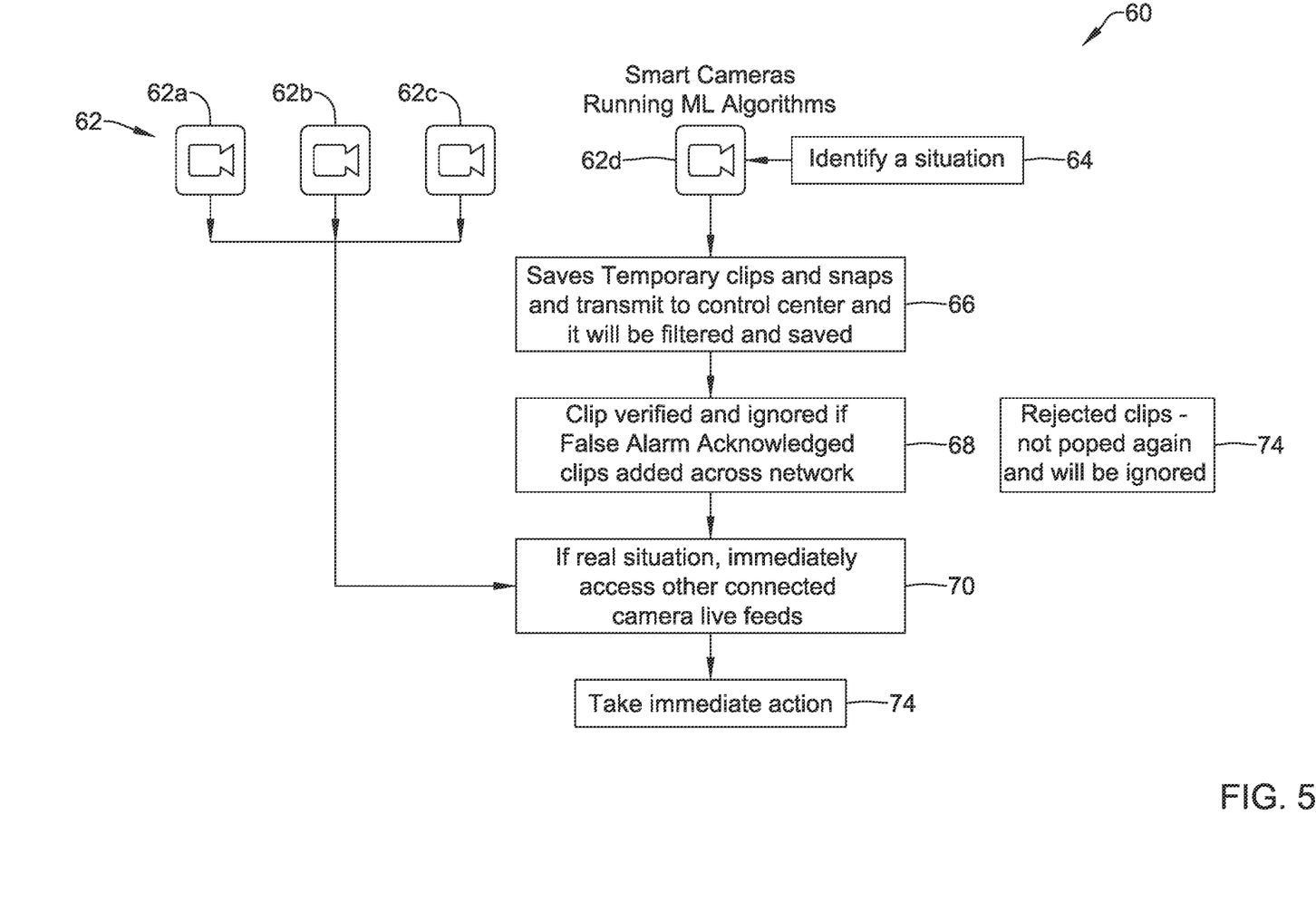
FIG. 5 is a schematic block diagram of an illustrative surveillance system.

FIG. 5 is a schematic block diagram of an illustrative surveillance system 60. The illustrative surveillance system 60 includes a number of video cameras 62 that are individually labeled as 62*a*, 62*b*, 62*c* and 62*d*. Each of the video cameras 62 are smart cameras that are running Machine Learning (ML) and/or Artificial Intelligence (AI) algorithms. In this example, the video camera 62*d* has identified a situation, as indicated at block 64. As indicated at block 66, the video camera 62*d* saves temporary video clips showing the situation, and transmits the temporary video clips to a control center (e.g. remote site 20 referenced in FIG. 1). At block 68, the temporary video clip is verified by an operator at the control center and ignored if identified as a false alarm by the operator. If the situation is confirmed as being of interest by the operator at the control center, as indicated at block 70, the control center immediately accesses the video feeds from other video cameras in the area, and if appropriate, the operator of the control center takes immediate action to address the situation as indicated at block 72. In some cases, the operator may send the temporary video clip to the authorities, such as the police, so that the authorities can take immediate action. In some cases, the live video feed may be provided to the authorities concurrently. If a situation is indicated to be a false alarm by the operator at the control center, the ML and/or AI algorithms in the video cameras 62 are updated such that any future situation of like kind that is detected by the video cameras 62 will be ignored by the video cameras 62, as indicated at block 74.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A surveillance video camera comprising:
a memory configured to store a network address for each of one or more neighboring video cameras, wherein each of the one or more neighboring video cameras is network accessible to the surveillance video camera via a network;
a camera having a field of view configured to capture a video stream of the field of view;
a network port;
one or more processors operably coupled with the memory, the camera and the network port, the one or more processors configured to:

perform video analysis on the video stream captured by the camera, looking for possible events of interest within the video stream, the video analysis includes object detection for detecting one or more objects within the video stream and for detecting one or more object characteristics for each of one or more objects;

when a possible event of interest is identified in the video stream:
generate event information associated with the identified possible event of interest, the event information including metadata that specifies one or more parameters for each of one or more objects associated with the identified possible event of interest including one or more object characteristics including one or more of an object type, an object color, an object size, and a spatial and/or temporal relationship between two or more objects;

retrieve from the memory the network address associated with a selected one of the one or more neighboring video cameras;

assemble one or more messages for transmission to the selected one of the one or more neighboring video cameras, each of the one or more messages including at least part of the event information, including the metadata that specifies one or more parameters for each of one or more objects associated with the identified possible event of interest, and a destination network address, wherein the destination network address is set to the network address of the selected one of the one or more neighboring video cameras; and send the one or more messages over the network via the network port, the one or more messages, once received by the selected one of the one or more neighboring video cameras, alerting the selected one of the one or more neighboring video cameras to use at least part of the event information including the metadata that specifies one or more parameters that can be used by the selected one of the one or more neighboring video cameras to perform video analysis on a video stream captured by a camera of the selected one of the one or more neighboring video cameras to identify one or more of the objects associated with the identified possible event of interest.

2. The surveillance video camera of claim 1, wherein the one or more processors are further configured to transmit at least some of the event information to a remote site, and receive back from the remote site a determination as to whether the identified possible event of interest represents a true event of interest or a false event of interest.

3. The surveillance video camera of claim 2, wherein the one or more processors are further configured to ignore any subsequent detection of the identified possible events of interest when the remote site reports back that the identified possible event of interest is a false event of interest.

4. The surveillance video camera of claim 1, wherein the memory is further configured to store relative location information of each of the one or more neighboring video cameras, and the one or more processors are configured to identify a direction of movement of one or more objects of the identified possible event of interest in the field of view of the camera, and use the relative location information of each of the one or more neighboring video cameras and the direction of movement of the one or more objects of the identified possible event of interest to identify the selected one of the one or more neighboring video cameras.

5. The surveillance video camera of claim 1, wherein the memory is further configured to store relative field of view information of the camera of each of the one or more neighboring video cameras, and the one or more processors are configured to identify a direction of movement of one or more objects of the identified possible event of interest in the field of view of the camera, and use the relative field of view information of the camera of each of the one or more neighboring video cameras and the direction of movement of the one or more objects of the identified possible event of interest to identify the selected one of the one or more neighboring video cameras.

6. The surveillance video camera of claim 1, wherein the one or more messages are sent over the network via the network port to the selected one of the one or more neighboring video cameras using a peer-to-peer communication protocol.

7. The surveillance video camera of claim 1, wherein the network comprises the Internet, and the network address of the selected one of the one or more neighboring video cameras is an Internet Protocol (IP) address.

8. The surveillance video camera of claim 1, wherein the event information comprises one or more of:
an image captured by the camera that is representative of the identified possible event of interest; and
a video clip captured by the camera that is representative of the identified possible event of interest.

9. The surveillance video camera of claim 1, wherein the one or more processors are configured to use Machine Learning (ML) and/or Artificial Intelligence (AI) when performing video analysis on the video stream to identify possible events of interest within the video stream.

10. The surveillance video camera of claim 1, wherein the video analysis comprises one or more of people detection, people counting, crowd detection, face detection, facial recognition, animal detection, car detection, license plate detection, fire detection, speed detection, direction detection, detection of weapons, detection of animals crossing their cage, detection of traffic violations, and detection of tampering with the video camera.

11. The surveillance video camera of claim 1, wherein the video analysis comprises tracking one or more objects in the field of view of the camera.

12. The surveillance video camera of claim 11, wherein the camera is a pan-tilt-zoom (PTZ) camera, and the video analysis comprises changing the field of view of the PTZ camera to track the one or more objects in the field of view of the camera.

13. A method of monitoring a monitored area for events of interest, the monitored area including a plurality of video cameras disposed about the monitored area, each of the plurality of video cameras storing relative location information and network address information for at least some of the other video cameras of the plurality of video cameras, the method comprising:
a video camera of the plurality of video cameras capturing a video stream showing a portion of the monitored area;
the video camera performing video analysis on the captured video stream, the video analysis includes object detection for detecting one or more objects within the video stream and for detecting one or more object characteristics for each of one or more objects;
when the video camera identifies an event of interest within the captured video stream:
the video camera generating event information associated with the identified event of interest, the event information including metadata that specifies one or more parameters for each of one or more objects associated with the identified possible event of interest including one or more object characteristics including one or more of an object type, an object color, an object size, and a spatial and/or temporal relationship between two or more objects;
the video camera using the relative location information to determining which video camera of the plurality of video cameras is positioned to capture the event of interest now and/or in the future, resulting in a selected neighboring video camera; and
the video camera using the network address information of the selected neighboring video camera to address a network communication to the selected neighboring video camera that includes at least part of the event information, including the metadata that specifies one or more parameters for each of one or more objects associated with the identified possible event of interest, the network communication instructing the selected neighboring video camera to perform video analysis on a video stream captured by a camera of the selected neighboring video camera to identify one or more of the objects associated with the identified event of interest.

14. The method of claim 13, further comprising the video camera sending at least some of the event information to a remote site, and to receive back whether the event of interest represents a true event or a false event.

15. The method of claim 14, further comprising the video camera ignoring any subsequent detection of the event of interest when the remote site returns back that the event of interest is a false event.

16. A non-transitory, computer-readable storage medium having stored thereon instructions that when executed by one or more processors of a video camera cause the one or more processors of the video camera to:
capture a video stream showing a field of view;
perform video analysis on the captured video stream to identify an event of interest within the field of view;
when the video camera detects an event of interest within the captured video stream:
capture a video clip of the event of interest;
use location information stored within the video camera to determine a particular video camera that is positioned to capture the event of interest now and/or in the future;
instruct the particular video camera to capture and track the event of interest;
send the video clip to a remote site; and
receive from the remote site a determination of whether the event of interest is a true event or a false event based at least in part on the video clip, wherein the determination is received after instructing the particular video camera to capture and track the event of interest.

* * * * *